(12) United States Patent
Kang et al.

(10) Patent No.: US 11,923,882 B2
(45) Date of Patent: Mar. 5, 2024

(54) COMMUNICATION DEVICE, OPERATION METHOD THEREOF, AND COMMUNICATION SYSTEM INCLUDING THE SAME

(71) Applicant: ELECTRONICS AND TELECOMMUNICATIONS RESEARCH INSTITUTE, Daejeon (KR)

(72) Inventors: Tae Wook Kang, Daejeon (KR); Sung Eun Kim, Daejeon (KR); Hyung-Il Park, Daejeon (KR); Jae-Jin Lee, Daejeon (KR); Hyuk Kim, Daejeon (KR); Kyung Hwan Park, Daejeon (KR); Mi Jeong Park, Sejong-si (KR); Kyung Jin Byun, Daejeon (KR); Kwang Il Oh, Daejeon (KR); In Gi Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 317 days.

(21) Appl. No.: 17/212,252

(22) Filed: Mar. 25, 2021

(65) Prior Publication Data
US 2021/0314011 A1    Oct. 7, 2021

(30) Foreign Application Priority Data
Apr. 3, 2020    (KR) .................. 10-2020-0041087

(51) Int. Cl.
*H04B 1/18*    (2006.01)
*H04B 5/00*    (2006.01)
*H04B 13/00*    (2006.01)

(52) U.S. Cl.
CPC ............ *H04B 1/18* (2013.01); *H04B 5/0031* (2013.01); *H04B 13/005* (2013.01)

(58) Field of Classification Search
CPC ...... H04B 1/18; H04B 5/0031; H04B 13/005; H04B 5/0012; H04B 5/0056; H04B 1/401; H04B 5/02
(Continued)

(56) References Cited

U.S. PATENT DOCUMENTS 9,379,786 B2    6/2016    Cho et al.
9,419,682 B2    8/2016    Jeon et al.
(Continued)

FOREIGN PATENT DOCUMENTS

KR    1020150078256 A    7/2015
KR    20200018352 A    2/2020

*Primary Examiner* — Eugene Yun
(74) *Attorney, Agent, or Firm* — Rabin & Berdo, P.C.

(57) ABSTRACT

A hybrid communication device, an operation method thereof, and a communication system including the same are provided. The hybrid communication device includes a contact unit that includes an antenna for receiving a first communication signal and an electrode for receiving a second signal, a switch controller that includes a first switch and a second switch and controls the first switch and the second switch based on a change in capacitance of the electrode, and a signal processing unit that receives at least one of the first communication signal and the second communication signal from the contact unit via the first switch and processes the received signal. The first switch is connected to the contact unit, and the signal processing unit is connected to the first switch.

18 Claims, 8 Drawing Sheets

(58) Field of Classification Search
USPC .......................................................... 455/41.1
See application file for complete search history.

(56) References Cited

U.S. PATENT DOCUMENTS

| | | |
|---|---|---|
| 10,009,071 B2 | 6/2018 | Tanaka |
| 2013/0181937 A1* | 7/2013 | Chen ..................... G06F 3/0446 345/174 |
| 2014/0171137 A1 | 6/2014 | Oh et al. |
| 2017/0272128 A1* | 9/2017 | Tanaka ................. H04B 5/0081 |
| 2019/0250678 A1 | 8/2019 | Kim et al. |
| 2021/0258044 A1 | 8/2021 | Kletsov et al. |

* cited by examiner

COMMUNICATION DEVICE, OPERATION METHOD THEREOF, AND COMMUNICATION SYSTEM INCLUDING THE SAME

CROSS-REFERENCE TO RELATED APPLICATIONS

This application claims priority under 35 U.S.C. § 119 to Korean Patent Application No. 10-2020-0041087 filed on Apr. 3, 2020, in the Korean Intellectual Property Office, the disclosures of which are incorporated by reference herein in their entireties.

BACKGROUND

Embodiments of the present disclosure described herein relate to a communication system, a communication device, and an operation method thereof, and more particularly, relate to a communication device for receiving and processing a communication signal which uses any one of the air or the human body as a medium, an operation method thereof, and a communication system including the same.

When using human body communication (HBC) which uses the human body as a communication medium, communication between portable devices or communication between a fixed device and a user may be performed in response to physical contact of the user to the device. In other words, a communication network between the devices or between the user and the device may be established by intuitive physical contact of the user. When using near field communication (NFC) communication which uses the air as a medium, communication between portable devices or between a fixed device and a device the user has, which supports the NFC communication, may be performed in response to proximity of the device supporting the NFC communication. In other words, a communication network between the devices or between the user and the device may be established as the user places the device supporting the NFC communication to be close to the device. The user may request a service module to provide a service such as output of printed matter, credit card payment, or gate opening and closing, by using the device supporting the NFC communication.

The HBC and the NFC communication may provide the user with a similar or same service. On the other hands, both the HBC and the NFC communication differ in operation principle and specification from each other. Because it is able for the user to use two different communication to request the same service, there is a need for a service module and a communication device which support both the HBC and the NFC communication.

SUMMARY

Embodiments of the present disclosure provide a communication device for operating in a human body communication (HBC) mode and a wireless communication mode, an operation method thereof, and a communication system including the same.

According to an embodiment, an electronic device may include a contact unit that includes an antenna for receiving a first communication signal and an electrode for receiving a second communication signal, a switch controller that includes a first switch and a second switch and controls the first switch and the second switch based on a change in capacitance of the electrode, and a signal processing unit that receives at least one of the first communication signal and the second communication signal from the contact unit via the first switch and processes the received signal. The first switch may be connected to the contact unit. The signal processing unit may be connected to the first switch.

According to an embodiment, an operation method of a communication device including an electrode and an antenna may include determining any one of a first communication mode and a second communication mode as an operation mode of the communication device based on an amount of change from an initial value of a capacitance of the electrode, receiving a communication signal based on the determined operation mode, generating a first switch control signal and a second switch control signal based on the determined operation mode, controlling a first switch circuit and a second switch circuit based on the first switch control signal and the second switch control signal, transmitting the received communication signal to any one of a wireless communication signal processing circuit and an HBC signal processing circuit via the first switch circuit, and processing the received communication signal.

According to an embodiment, a communication system may include a processor, a communication device that is controlled by the processor, includes an electrode, an antenna, an HBC signal processing circuit, and a wireless communication signal processing circuit, and receives a communication signal via any one of the electrode and the antenna, and a service module that uses the communication signal.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail to such an extent that those skilled in the art easily carry out the present disclosure.

Hereinafter, an embodiment of the present disclosure will be described in detail with reference to the accompanying drawings. The same reference numerals are used for the same components throughout the drawings and redundant descriptions of the same components are omitted, in order to facilitate the overall understanding in describing the present disclosure.

Figure 1A:
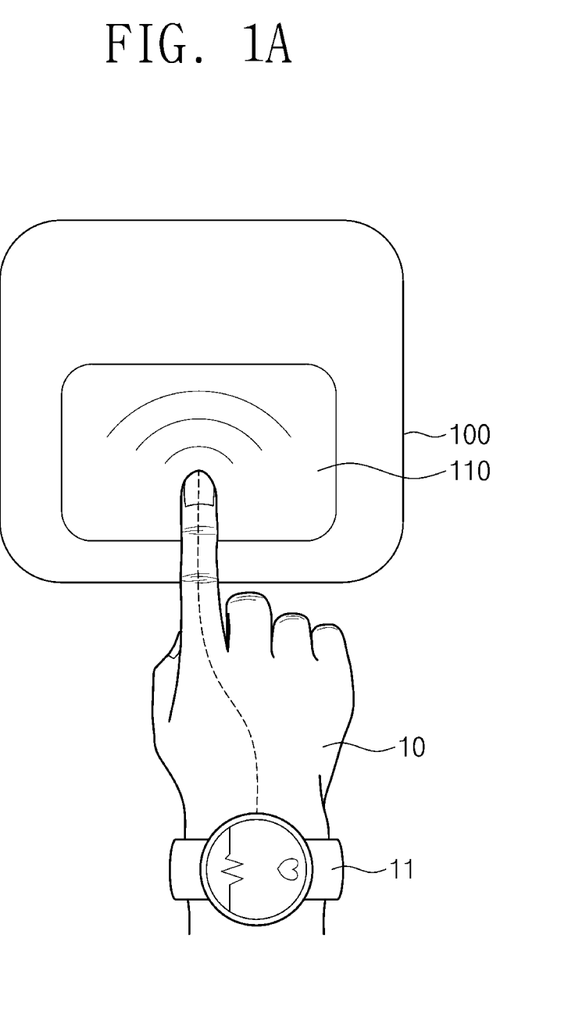
FIG. 1A illustrates a schematic diagram of a communication device according to an embodiment of the present disclosure.

FIG. 1A illustrates a schematic diagram of a communication device according to an embodiment of the present disclosure. Referring to FIG. 1A, a communication device 100 may include a contact unit 110. The communication device 100 may detect a contact of a user 10. For example, the user 10 may come into contact with the contact unit 110 of the communication device 100. In detail, a part of the body of the user 10 may be in contact with the contact unit 110. In FIG. 1A, it is shown that the finger of the user 10 is in contact with the contact unit 110, but a part of the body of the user 10 capable of being in contact with the contact unit 110 is not limited thereto. For example, the user 10 may come into contact with the contact unit 110 by using various body parts such as a palm, an elbow, a forehead, or a foot.

A communication signal which uses the human body or the living body as a medium (hereinafter, referred to as "human body communication (HBC) signal", see S_HB of FIG. 5) may be transmitted to the communication device 100 in a HBC device 11 via the user 10. In an embodiment, the HBC device 11 may be a portable device, such as a wearable device (e.g., a smart watch), a digital camera, or a smartphone, supporting HBC or a fixed device supporting the HBC.

For example, the communication device 100 may measure a capacitance of an electrode (e.g., 112 of FIG. 2) in the contact unit 110, may calculate an amount of change from an initial value of the measured capacitance, and may determine whether there is a contact of the user 10 by comparing the calculated amount of change with a threshold. The communication device 100 may process an HBC signal received via a part of the body of the user 10. The communication device 100 may be referred to as an adaptive, selective, or hybrid communication device. A detailed operation of the communication device 100 will be described below.

Figure 1B:
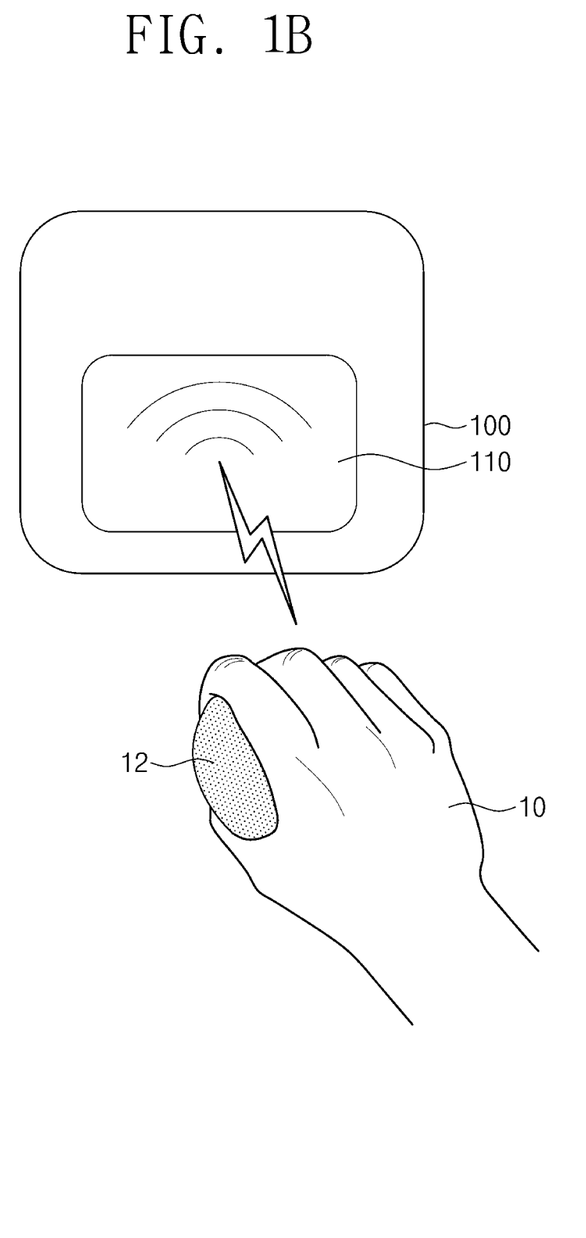
FIG. 1B illustrates a schematic diagram of a communication device according to another embodiment of the present disclosure.

FIG. 1B illustrates a schematic diagram of a communication device according to another embodiment of the present disclosure. Referring to FIGS. 1A and 1B, a communication device 100 may detect approaching of a wireless communication device 12. For example, the communication device 100 may receive a communication signal (hereinafter, referred to as "wireless communication signal", see S_WL of FIG. 4) which uses the air as a medium, which is transmitted from the wireless communication device 12, by using a receiver (e.g., 111 of FIG. 1) or the like. In an embodiment, the wireless communication signal may be a near field communication (NFC) signal, but a type of the communication signal is not limited thereto. For example, the wireless communication signal may meet any one of various specifications or standards, such as wireless-fidelity (Wi-Fi) (or wireless local area network (WLAN) or institute of electrical and electronics engineers (IEEE) 802.11), mobile communication, Bluetooth, and beacon. The communication device 100 may process the wireless communication signal transmitted from the wireless communication device 12. A detailed operation of the communication device 100 will be described below.

Figure 2:
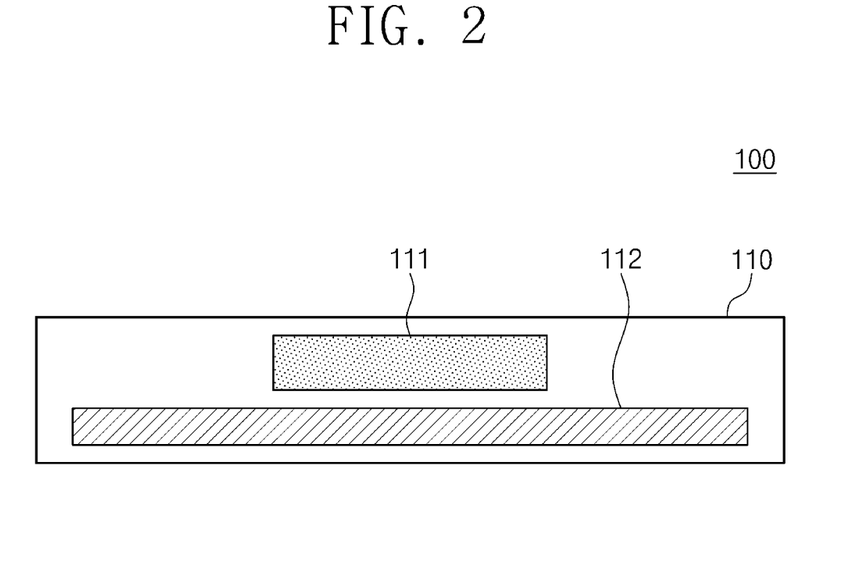
FIG. 2 illustrates a cross-sectional view of a communication device according to an embodiment of the present disclosure.

FIG. 2 illustrates a cross-sectional view of a communication device according to an embodiment of the present disclosure. Referring to FIGS. 1A, 1B, and 2, a contact unit 110 of a communication device 100 may include an antenna 111 and an electrode 112. FIG. 2 is a cross-sectional view of the side surface of the communication device 100. A case surrounding the antenna 111 and the electrode 112, that is, the inside of the contact unit 110 may include an insulating material.

The antenna 111 may receive a communication signal. For example, when a user 10 locates (or arranges or places) a wireless communication device 12 to be within a certain distance from the antenna 111, the antenna 111 may receive a wireless communication signal transmitted from the wireless communication device 12. While the wireless communication signal moves between the wireless communication device 12 and the antenna 111, intensity of the wireless communication signal may be reduced. A distance which should be maintained between the wireless communication device 12 and the antenna 111 may be determined according to standards of the communication signal transmitted by the wireless communication device 12. For example, when the communication signal is an NFC signal, the distance between the wireless communication device 12 and the antenna 111 may be less than or equal to 0.2 [m]. In other words, when the user 10 does not locate the wireless communication device 12 to be within the distance of 0.2 [m] from the antenna 111, the antenna 111 may fail to receive the NFC signal transmitted from the wireless communication device 12, or intensity of the received NFC signal may be too small although receiving the NFC signal. Thus, the communication device 100 may fail to process the received NFC signal.

In an embodiment, the antenna 111 of the contact unit 110 may be implemented as a pattern antenna. Thus, a size and a weight of the antenna 111 may be minimized. For example, the antenna 111 may be implemented on a substrate such as a microstrip.

The electrode 112 may receive a communication signal, which uses the human body or the living body as a medium, from an HBC device 11 worn on the user 10. The communication device 100 may detect a contact of the user 10 to the contact unit 110 based on magnitude of an amount of change from an initial value of capacitance (not shown) in the electrode 112. The electrode 112 may include a conductive material. The electrode 112 may transmit the communication signal to a signal processing unit (e.g., 130 of FIG. 3) via a switch (e.g., 121 of FIG. 3).

Figure 3:
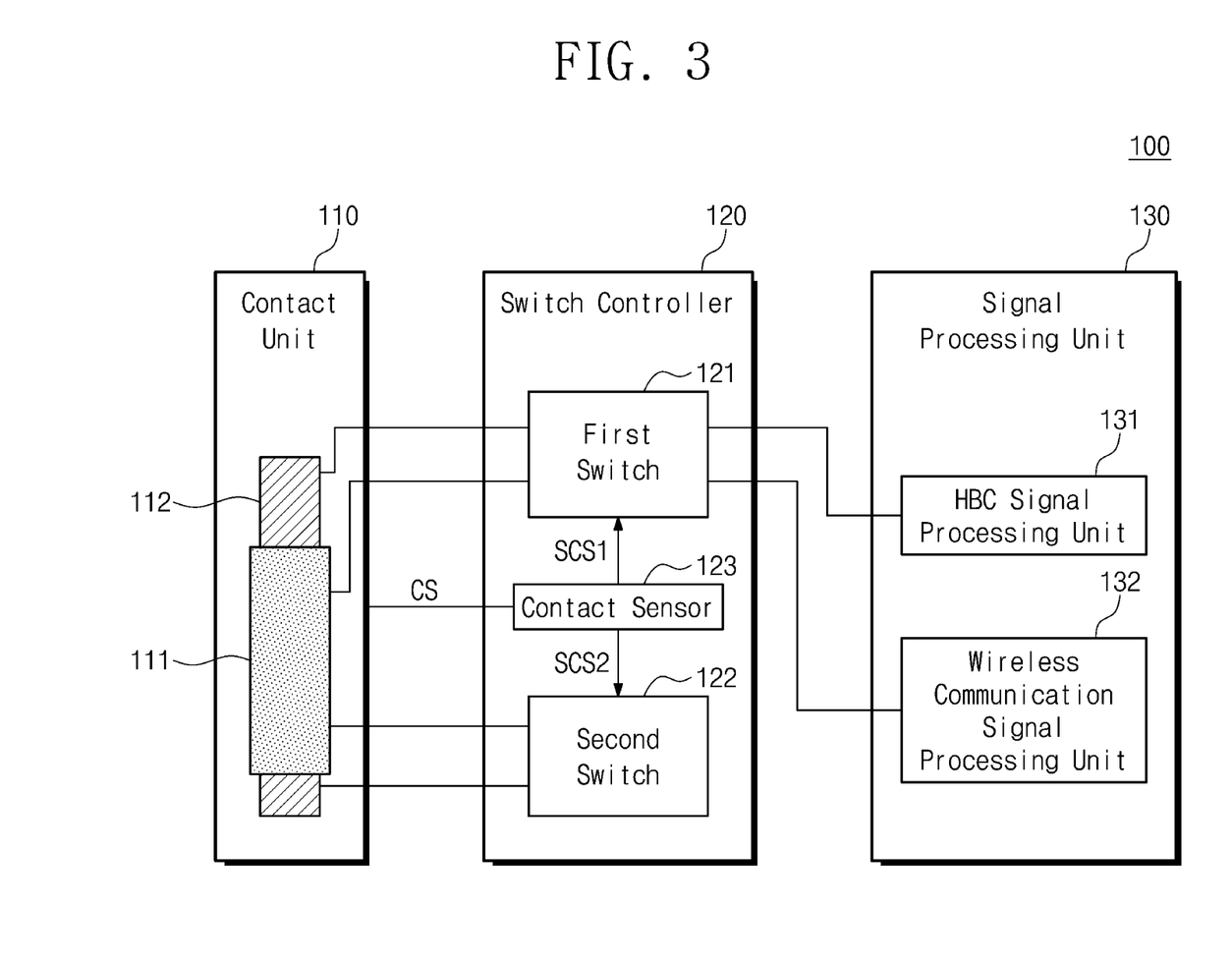
FIG. 3 illustrates a block diagram of a communication device according to an embodiment of the present disclosure.

FIG. 3 illustrates a block diagram of a communication device according to an embodiment of the present disclosure. Referring to FIGS. 1A, 1B, 2, and 3, a communication device 100 may include a contact unit 110, a switch controller 120, and a signal processing unit 130.

The contact unit 110 may include an antenna 111 and an electrode 112. The antenna 111 may receive a wireless communication signal from a wireless communication device 12. The antenna 111 may transmit the received wireless communication signal to a wireless communication signal processing unit 132 via a first switch 121. The electrode 112 may receive an HBC signal from an HBC device 11. The electrode 112 may transmit the received HBC signal to an HBC signal processing unit 131 via the first switch 121.

The switch controller 120 may include a first switch 121, a second switch 122, and a contact sensor 123. The first switch 121 may be electrically connected to each of the antenna 111, the electrode 112, the HBC signal processing unit 131, and the wireless communication signal processing unit 132. The second switch 122 may be electrically connected to each of the antenna 111 and the electrode 112. The communication device 100 may control the first switch 121 and the second switch 122 to selectively receive and process any one of the HBC signal or the wireless communication signal. Detailed operations of the first switch 121 and the second switch 122 will be described below.

The contact sensor 123 may determine whether a part of the body of the user 10 is in contact with the contact unit 110. For example, the contact sensor 123 may measure a capacitance of the electrode 112 of the contact unit 110. The contact sensor 123 may include an envelope detector. The contact sensor 123 may transmit a continuous wave to the electrode 112 of the contact unit 110. The contact sensor 123 may detect an envelope of the continuous wave transmitted to the electrode 112 to measure capacitance formed between the electrode 112 and a ground end (not shown) of the contact unit 110. In this case, a change in the capacitance formed between the electrode 112 and the ground end of the contact unit 110 may be caused because a part of the body of the user 10 approaches the contact unit 110.

In detail, the narrower the distance between the part of the body of the user 10 and the electrode 112, that is, the closer the part of the body of the user 10 is to the electrode 112, the more the magnitude of coupling capacitance between the part of the body of the user 10 and the electrode 112 may increase. Thus, the contact sensor 123 may measure a level of the envelope of the continuous wave and may compare the measured level of the envelope with an initial value to detect a change in voltage corresponding to a change in coupling capacitance. The contact sensor 123 may compare the calculated amount of change with a threshold.

For example, when the calculated amount of threshold is less than the threshold, the contact sensor 123 may determine that the part of the body of the user 10 is not in contact with the electrode 112. In this case, the contact sensor 123 may generate a first switch control signal SCS1 and a second switch control signal SCS2 such that the communication device 100 operates in a first communication mode (or a wireless communication mode). In other words, the contact sensor 123 may determine the first communication mode as an operation mode of the communication device 100.

On the other hands, when the calculated amount of threshold is greater than or equal to the threshold, the contact sensor 123 may determine that the part of the body of the user 10 is in contact with the electrode 112. In this case, the contact sensor 123 may generate the first switch control signal SCS1 and the second switch control signal SCS2 such that the communication device 100 operates in a second communication mode (or an HBC mode). In other words, the contact sensor 123 may determine the second communication mode as an operation mode of the communication device 100.

In this case, sensitivity of the contact sensor 123 may be adjusted by adjusting magnitude of the initial value or the threshold. For example, the more the magnitude of the initial value decreases, the more the amount of change calculated by the contact sensor 123 may increase, and thus, the more the sensitivity of the contact sensor 123 may increase.

The contact sensor 123 may transmit the generated first switch control signal SCS1 to the first switch 121. The contact sensor 123 may transmit the generated second switch control signal SCS2 to the second switch 122. Thus, the contact sensor 123 may control operations of the first switch 121 and the second switch 122 based on whether the part of the body of the user 10 is in contact with the electrode 112. The contact sensor 123 may be referred to as a switch controller or the like. The operation of each of the first switch 121 and the second switch 122 according to the first communication mode and the second communication mode will be described in detail below.

The signal processing unit 130 may include an HBC signal processing unit 131 and a wireless communication signal processing unit 132. The HBC signal processing unit 131 may be electrically connected to the first switch 121. The HBC signal processing unit 131 may receive an HBC signal via the first switch 121 from the electrode 112. The HBC signal processing unit 131 may process the received HBC signal. For example, the HBC signal processing unit 131 may convert the received HBC signal into a digital signal. The HBC signal processing unit 131 may modulate, demodulate, or encode the converted digital signal for its purpose. The HBC signal processing unit 131 may include a filter for removing noise or the like included in the received HBC signal, a comparator, or the like. The HBC signal processing unit 131 may amplify intensity of the received HBC signal.

The wireless communication signal processing unit 132 may be electrically connected to the first switch 121. An end of the first switch 121, which is connected to the HBC signal processing unit 131, and an end of the first switch 121, which is connected to the wireless communication signal processing unit 132, may differ from each other. The wireless communication signal processing unit 132 may receive a wireless communication signal via the first switch 121 from the antenna 111. The wireless communication signal processing unit 132 may process the received wireless communication signal in a similar manner to the HBC signal processing unit 131.

Figure 4:
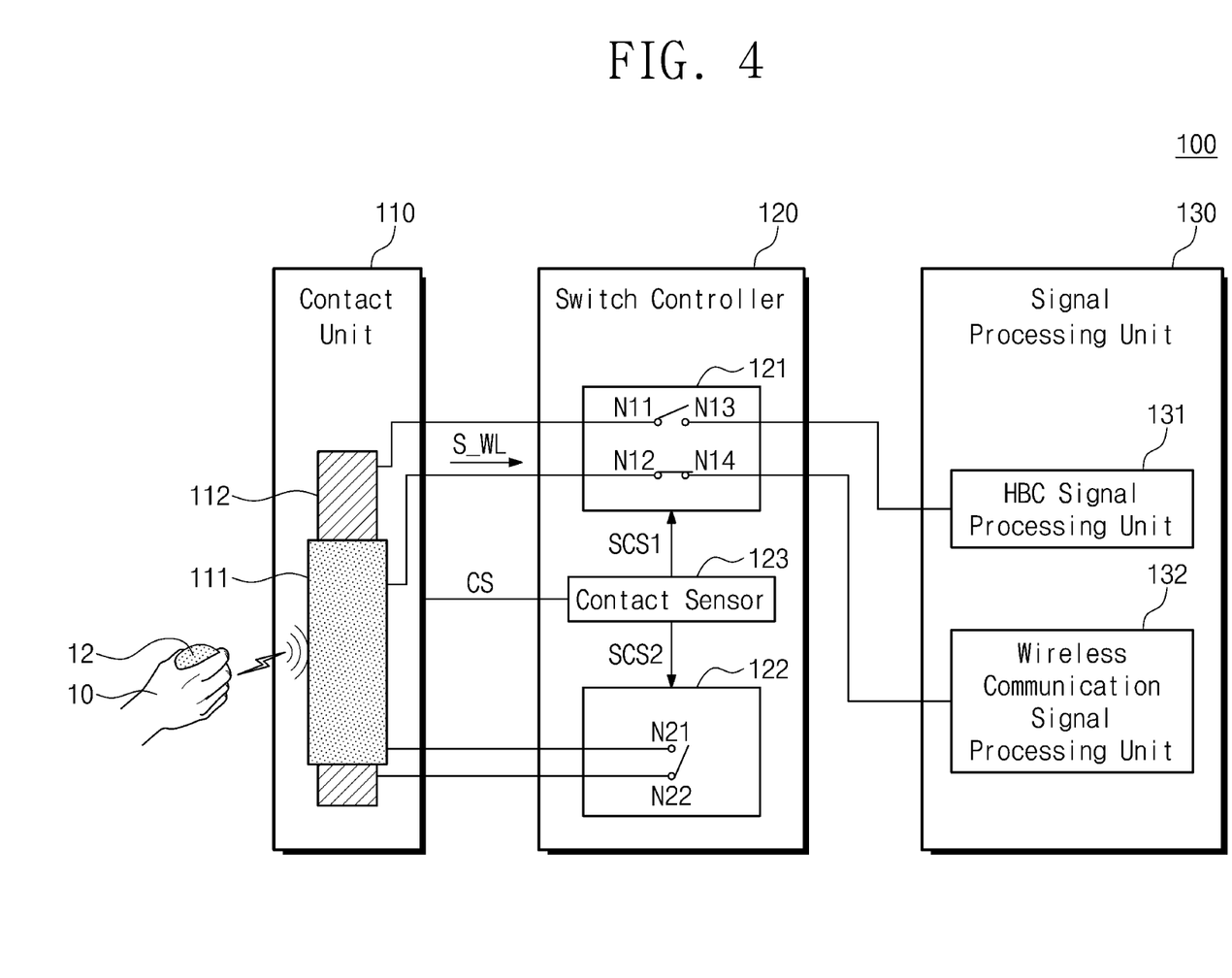
FIG. 4 illustrates a circuit diagram when a communication device of FIG. 3 operates in a first communication mode.

FIG. 4 illustrates a circuit diagram when a communication device of FIG. 3 operates in a first communication mode. Referring to FIGS. 1A, 1B, and 2 to 4, as a user 10 places a wireless communication device 12 to be close to an antenna 111, operations of a first switch 121 and a second switch 122 of a switch controller 120 may be controlled.

The first switch 121 may include first to fourth ends (or terminals or nodes) N11 to N14. The first end N11 may be connected to an electrode 112. The second end N12 may be connected to the antenna 111. The third end N13 may be connected to an HBC signal processing unit 131. The fourth end N14 may be connected to a wireless communication signal processing device 132. In an embodiment, the first switch 121 may include a first internal switch including the first end N11 and the third end N13 and a second internal switch including the second end N12 and the fourth end N14. In the first communication mode, the first switch 121 may receive a first switch control signal SCS1 from a contact sensor 123. The first switch 121 may electrically disconnect the first end N11 of the first switch 121 from the third end N13, in response to the received first switch control signal SCS1. The first switch 121 may electrically connect the second end N12 of the first switch 121 to the fourth end N14, in response to the received first switch control signal SCS1. In other words, based on the first switch control signal SCS1, the first internal switch of the first switch 121 may be open-circuited and the second internal switch may be short-circuited.

As a result, in the first communication mode, the communication device 100 may receive a wireless communication signal S_WL by using the antenna 111 and may process the received wireless communication signal S_WL by using the wireless communication signal processing unit 132. Thus, the communication device 100 may process a signal in a manner suitable for the communication signal provided by the user 10.

The second switch 122 may include a first end N21 and a second end N22. The first end N21 of the second switch 122 may be connected to the antenna 111. The second end N22 of the second switch 122 may be connected to the electrode 112. In the first communication mode, the second switch 122 may receive a second switch control signal SCS2 from a contact sensor 123.

In the first communication mode, the second switch 122 may electrically disconnect the first end N21 of the second switch 122 from the second end N22, in response to the received second switch control signal SCS2. In other words, the second switch 122 may be open-circuited. Thus, the antenna 111 and the electrode 112 may be electrically separated from each other. As a result, the electrode 112 may fail to affect that the antenna 111 receives the wireless communication signal S_WL.

Figure 5:
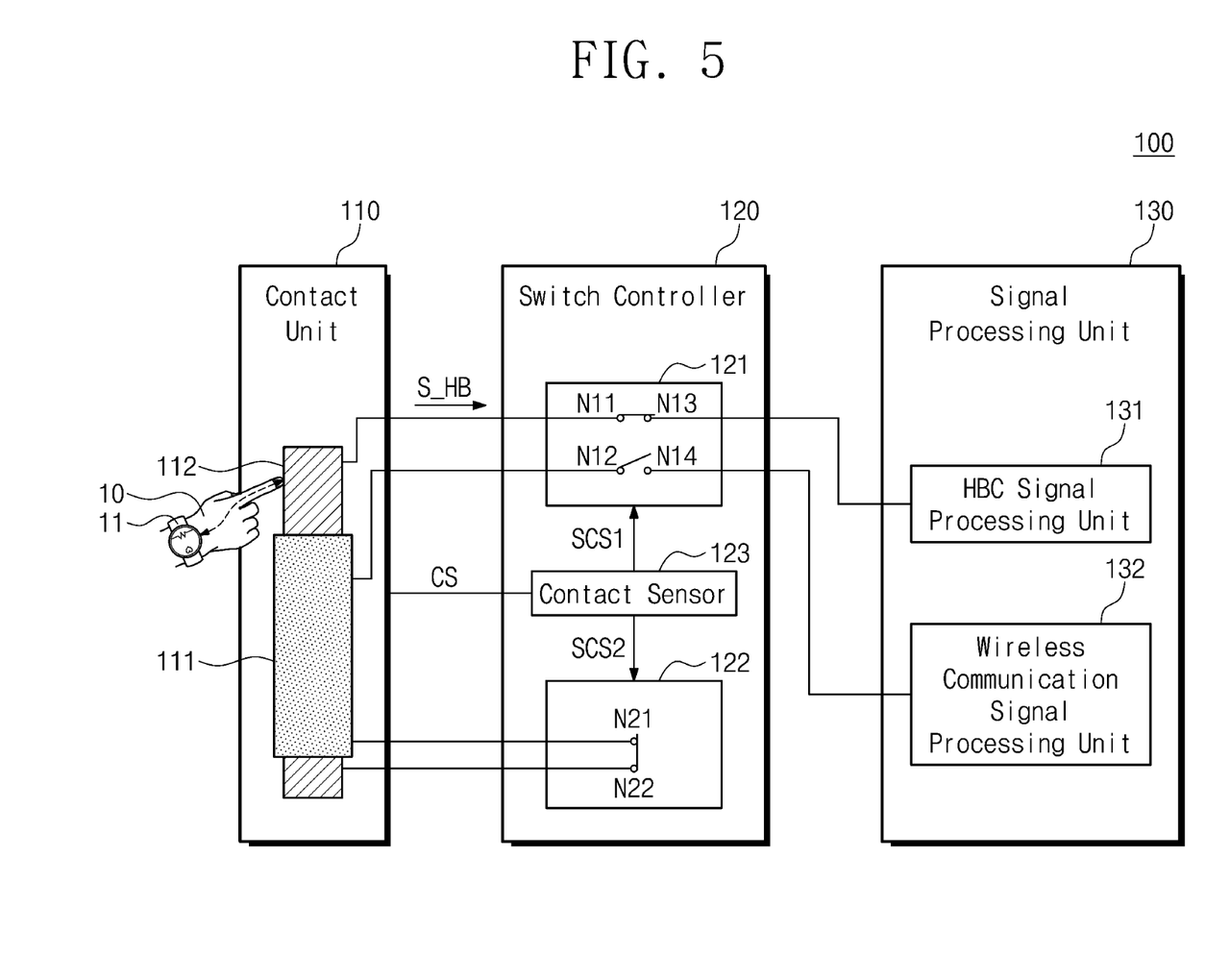
FIG. 5 illustrates a circuit diagram when a communication device of FIG. 3 operates in a second communication mode.

FIG. 5 illustrates a circuit diagram when a communication device of FIG. 3 operates in a second communication mode. Referring to FIGS. 1A, 1B, and 2 to 5, as a part of the body of a user 10 is in contact with an electrode 112, operations of a first switch 121 and a second switch 122 of a switch controller 120 may be controlled.

In the second communication mode, the first switch 121 may receive a first switch control signal SCS1 from a contact sensor 123. The first switch 121 may electrically connect a first end N11 of the first switch 121 to a third end N13, in response to the received first switch control signal SCS1. The first switch 121 may electrically disconnect a second stage N12 of the first switch 121 from a fourth end N14, in response to the received first switch control signal SCS1. In other words, in response to the first switch control signal SCS1, a first internal switch of the first switch 121 may be short-circuited (or disconnected) and the second internal switch may be open-circuited (or connected).

As a result, in the second communication mode, the communication device 100 may receive an HBC signal S_HB by using the electrode 112 and may process the received HBC signal S_HB by using an HBC signal processing unit 131. Thus, the communication device 100 may process a signal in a manner suitable for the communication signal provided by the user 10.

In the second communication mode, the second switch 122 may receive a second switch control signal SCS2 from the contact sensor 123. The second switch 122 may electrically connect a first end N21 of the second switch 122 to a second end N22, in response to the received second switch control signal SCS2. In other words, the second switch 122 may be short-circuited. Thus, the antenna 111 and the electrode 112 may be electrically connected to each other. As a result, the antenna 111 may perform the same function as the electrode 112. In other words, the antenna 111 may receive the HBC signal S_HB from an HBC device 11 in a similar manner to the electrode 112. The HBC signal S_HB received by the antenna 111 may be transmitted to an HBC signal processing unit 131 via the electrode 112 and the first switch 121.

Figure 6:
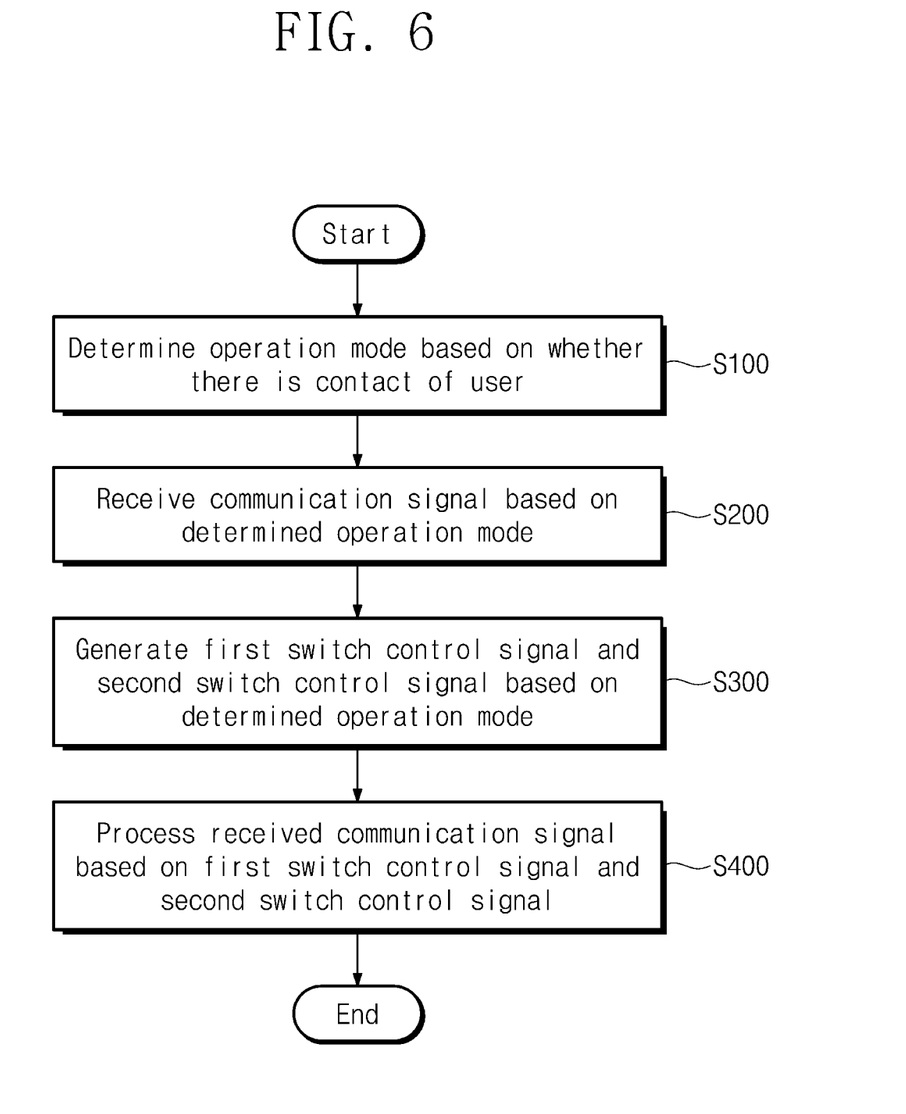
FIG. 6 illustrates a flowchart of an operation method of a communication device of FIG. 3.

FIG. 6 illustrates a flowchart of an operation method of a communication device of FIG. 3. Referring to FIGS. 1A, 1B, and 2 to 6, a communication device 100 may perform operations S100 to S400.

In operation S100, the communication device 100 may determine an operation mode based on whether there is a contact of a user 10. For example, a contact sensor 123 of the communication device 100 may determine whether a part of the body of the user 10 is in contact with an electrode 112. Operation S100 will be described in detail below.

In operation S200, the communication device 100 may receive a communication signal based on the operation mode determined in operation S100. For example, the communication device 100 may receive a communication signal (e.g., S_WL of FIG. 4 or S_HB of FIG. 5) from an external device (e.g., 11 of FIG. 1A or 12 of FIG. 1B) by means of any one of an antenna 111 or the electrode 112.

In detail, when a first communication mode is determined as the operation mode of the communication device 100 in operation S100, the antenna 111 of the communication device 100 may receive a wireless communication signal S_WL from a wireless communication device 12. When a second communication mode is determined as the operation mode of the communication device 100 in operation S100, the electrode 112 of the communication device 100 may receive an HBC signal S_HB from an HBC device 11.

The communication device 100 may operate in any one of the first communication mode and the second communication mode as the operation mode and thus may adaptively correspond to a type of a communication signal. The communication device 100 may adaptively receive a communication signal in response to a communication scheme (e.g., wireless communication or HBC) used by a user 10.

In operation S300, the communication device 100 may generate a first switch control signal SCS1 and a second switch control signal SCS2 based on the operation mode determined in operation S100. For example, a contact sensor 123 of the communication device 100 may generate the first switch control signal SCS1 and the second switch control signal SCS2, based on the operation mode determined in operation S100. The contact sensor 123 may transmit the generated first switch control signal SCS1 to the first switch 121. The contact sensor 123 may transmit the generated second switch control signal SCS2 to the second switch 122.

In operation S400, the communication device 100 may process the communication signal received in operation S200, based on the first switch control signal SCS1 and the second switch control signal SCS2. For example, a signal processing unit 130 of the communication device 100 may receive the communication signal S_WL or S_HB received in operation S200, via a switch controller 120. The signal processing unit 130 of the communication device 100 may process the received communication signal S_WL or S_HB.

For example, the communication device 100 may control each of the first switch 121 and the second switch 122 in the above-mentioned manner in FIGS. 4 and 5 based on each of the first switch control signal SCS1 and the second switch control signal SCS2 generated in operation S300.

The wireless communication signal S_WL received via the antenna 111 in operation S200 may be transmitted to the wireless communication signal processing unit 132 via the first switch 121. The wireless communication signal processing unit 132 may process the received wireless communication signal S_WL.

The HBC signal S_HB received via the electrode 112 in operation S200 may be transmitted to the HBC signal processing unit 131 via the first switch 121. The HBC signal processing unit 131 may process the received HBC signal S_HB.

Figure 7:
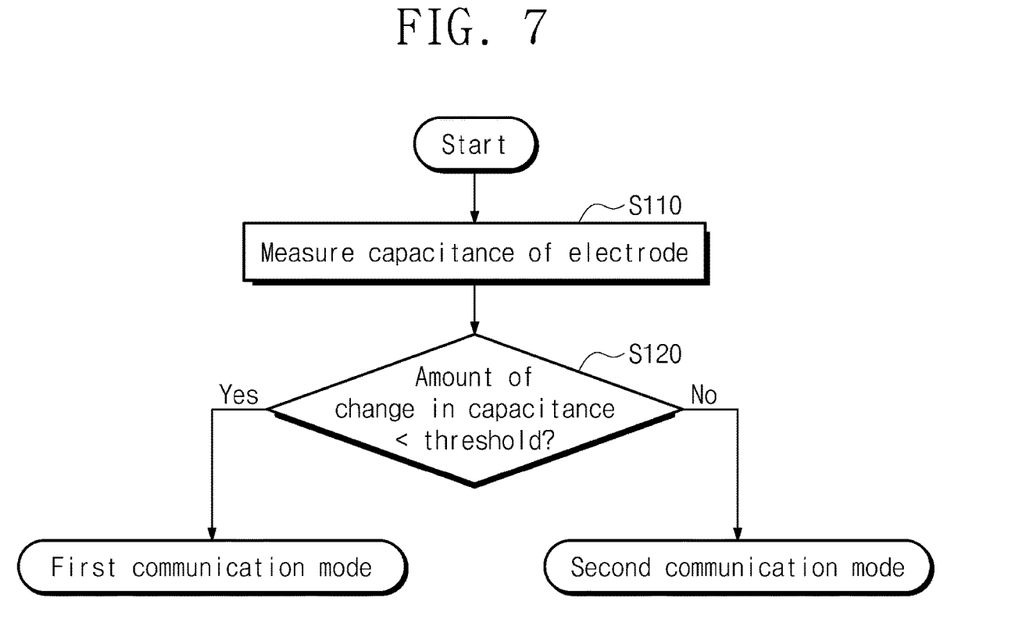
FIG. 7 illustrates detailed operations of operation S100 of FIG. 6.

FIG. 7 illustrates detailed operations of operation S100 of FIG. 6. Referring to FIGS. 1A, 1B, and 2 to 7, a communication device 100 may perform operation S110 and operation S120.

In operation S110, the communication device 100 may measure a capacitance of an electrode 112. For example, a contact sensor 123 of the communication device 100 may measure a capacitance of the electrode 112 in the above-mentioned manner. A period when the contact sensor 123 measures the capacitance of the electrode 112 may be determined based on the total amount of power available to the communication device 100.

In operation S120, the communication device 100 may determine an operation mode of the communication device 100 based on an amount of change in the capacitance measured in operation S110. For example, the contact sensor 123 of the communication device 100 may determine any one of a first communication mode and a second communication mode as an operation mode of the communication device 100 in the above-mentioned manner.

Figure 8:
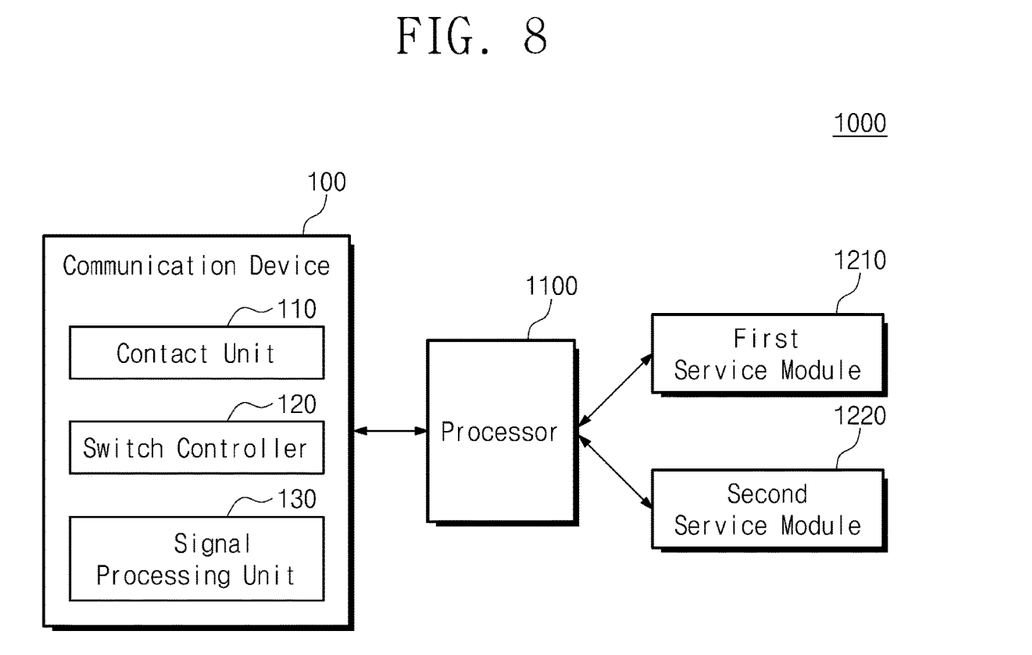
FIG. 8 illustrates a system according to an embodiment of the present disclosure.

FIG. 8 illustrates a communication system according to an embodiment of the present disclosure. Referring to FIGS. 1A, 1B, and 2 to 8, a communication system 1000 may include a communication device 100, a processor 1100, a first service module 1210, and a second service module 1220. The service modules 1210 and 1220 are shown as two for convenience of illustration, but the communication system 1000 may include one or more service modules. In other words, the number of service modules is not limited to the shown example.

The communication device 100 may support various communication signals depending on a request of a user 10, under control of the processor 1100. For example, the communication device 100 may determine whether a part of the body of the user 10 is in contact with a contact unit 110. When it is determined that the part of the body of the user 10 is in contact with the contact unit 110, the communication device 100 may receive an HBC signal S_HB, which uses the human body as a medium, from an HBC device 11 and may process the received HBC S_HB. On the other hand, when it is determined that the part of the body of the user 10 is not in contact with the contact unit 110, the communication device 100 may receive a wireless communication signal S_WL, which uses the air as a medium, from a wireless communication device 12 and may process the received wireless communication signal S_WL.

The processor 1100 may play a role as a central processing unit of the communication system 1000. For example, the processor 1100 may run an application, an application program, software, or the like for determining an operation mode of the communication device 100, receiving a signal from an external device (e.g., 11 of FIG. 1A or 12 of FIG. 1B) based on the determined operation mode, processing the received signal, and transmitting the processed signal to at least one of the first service module 1210 or the second service module 1220 in response to a request of the user 10.

Under control of the processor 1100, the first service module 1210 and the second service module 1220 may receive the signal processed by the communication device 100. In an embodiment, the first service module 1210 may be a print, and the second service module 1220 may be a credit card payment module. In response to a request of the user 10, the communication device 100 may receive and process the HBC signal S_HB or the wireless communication signal S_WL and may transmit the HBC signal S_HB or the wireless communication signal S_WL to the first service module 1210 and the second service module 1220. The first service module 1210 and the second service module 1220 may provide the user 10 with a service desired by the user 10, based on the received signal.

For example, the first service module 1210 may output a document, a photo, or the like, which is digitally recorded, in response to a request of the user 10. In this case, to request the first service module 1210 to output the document or the like, the user 10 may selectively use any one of an HBC device 11 and the wireless communication device 12. For example, the user 10 may wear the HBC device 11 in a similar manner as that shown in FIG. 1A and may come into direct contact with the contact unit 110 of the communication device 100 using a part of his or her body. For another example, the user 10 may have the wireless communication device 12 in a similar manner as that shown in FIG. 1B and may place the wireless communication device 12 to be close to the contact unit 110 of the communication device 100.

In response to an operation (or an action) of the user 10, the communication device 100 may receive the HBC signal S_HB from the HBC device 11, in the above-mentioned manner in FIGS. 3 to 7, and may process the received HBC signal S_HB to be suitable for an HBC protocol. Alternatively, the communication device 100 may receive the wireless communication signal S_WL from the wireless communication device 12, in the above-mentioned manner in FIGS. 3 to 7, and may process the received wireless communication signal S_WL to be suitable for a wireless communication protocol. The communication device 100 may transmit the processed HBC signal S_HB or the processed wireless communication signal S_WL to the first service module 1210. The first service module 1210 may output the document or the like in response to the request of the user 10, based on the received HBC signal S_HB or the received wireless communication signal S_WL.

For example, the second service module 1220 may be a credit card payment module. In a similar manner to the first service module 1210, the second service module 1220 may receive a request of the user 10 via the communication device 100 and may provide the user 10 with a credit card payment service in response to the request of the user 10. For another example, the second service module 1220 may be a gate opening and closing module. As described above, the second service module 1220 may receive a request of the user 10 via the communication device 100 and may open or close a gate in response to the request of the user 10.

As described above, the user 10 may request the same service (e.g., printing, output, payment, gate control, or the like) from the communication system 1000 using any one of the HBC device 11 and the wireless communication device 12. In other words, the user 10 may request the same service in communication schemes which use different specifications. HBC and wireless communication may provide the user 10 with a similar or same service, but operation schemes and specifications (standards or protocols) of both the HBC and the wireless communication may be different from each other. The communication device 100 according to an embodiment of the present disclosure may support both of two different communication schemes, thus improving convenience of the user 10.

The communication device according to an embodiment of the present disclosure may receive any one of a HBC signal and a wireless communication signal and may process the received signal. Thus, the communication device may provide the user 10 with various communication schemes. As a result, the communication device having improved performance capable of increasing convenience of the user 10 may be provided.

The above-mentioned contents are detailed embodiments for executing the present disclosure. The present disclosure may include embodiments capable of being simply changed in design or being easily changed, as well as the above-mentioned embodiments. Furthermore, the present disclosure may also include technologies capable of being easily modified and executed using embodiments. Therefore, the spirit and scope of the present disclosure is defined not by the above-described embodiments, but by those that are identical or equivalent to the claims of the present disclosure as well as the appended claims, which will be described below.

What is claimed is:

1. An electronic device, comprising:
a contact unit including an antenna receiving a first communication signal and an electrode receiving a second communication signal;
a switch controller including a first switch and a second switch, and the switch controller controlling the first switch and the second switch based on a change in capacitance of the electrode; and
a signal processing unit which receives at least one of the first communication signal and the second communication signal from the contact unit via the first switch and processes the received signal,
wherein the first switch is connected to the contact unit,
wherein the signal processing unit is connected to the first switch,
wherein the switch controller further includes a contact sensor which determines whether an amount of the change in the capacitance of the electrode is greater than or equal to a threshold, and
wherein the electronic device is configured to
operate in a first communication mode in response to the contact sensor determining that the change in the capacitance of the electrode is less than the threshold, and
operate in a second communication mode in response to the contact sensor determining that the change in the capacitance of the electrode is greater than or equal to the threshold.

2. The electronic device of claim 1, wherein the first communication signal includes a near field communication (NFC) signal.

3. The electronic device of claim 1, wherein one end of the first switch and one end of the second switch are connected to the antenna, and
wherein another end of the first switch and another end of the second switch are connected to the electrode.

4. The electronic device of claim 1, wherein the signal processing unit includes a human body communication (HBC) signal processing unit and a wireless communication signal processing unit, and
wherein one end of the first switch is connected to the HBC signal processing unit and another end of the first switch is connected to the wireless communication signal processing unit.

5. The electronic device of claim 1, wherein the signal processing unit includes an HBC signal processing unit and a wireless communication signal processing unit.

6. The electronic device of claim 5, wherein the contact sensor measures the capacitance of the electrode and determines whether an amount of change from an initial value of the measured capacitance is greater than or equal to the threshold.

7. The electronic device of claim 6, wherein the contact sensor outputs a first switch control signal to the first switch and outputs a second switch control signal to the second switch, when the amount of the change in the capacitance is greater than or equal to the threshold,
wherein an end of the first switch, the end being connected to the electrode, is electrically disconnected from an end connected to the HBC signal processing unit and an end of the first switch, the end being connected to the antenna, is electrically connected to an end connected to the wireless communication signal processing unit, based on the first switch control signal, and
wherein an end of the second switch, the end being connected to the electrode, is electrically connected to an end of the second switch, the end being connected to the antenna, based on the second switch control signal.

8. The electronic device of claim 6, wherein the contact sensor outputs a first switch control signal to the first switch and outputs a second switch control signal to the second switch, when the amount of the change in the capacitance is less than the threshold,
wherein an end of the first switch, the end being connected to the electrode, is electrically connected to an end connected to the HBC signal processing unit, and an end of the first switch, the end being connected to the antenna, and an end of the first switch, the end being connected to the wireless communication signal processing unit, are electrically disconnected from each other, based on the first switch control signal, and
wherein an end of the second switch, the end being connected to the electrode, is electrically disconnected from an end of the second switch, the end being connected to the antenna, based on the second switch control signal.

9. The electronic device of claim 1, wherein the first communication signal uses the air as a medium, and
wherein the second communication signal uses the human body as a medium.

10. An operation method of a communication device including an electrode and an antenna, the operation method comprising:
determining any one of a first communication mode and a second communication mode as an operation mode of the communication device based on an amount of change from an initial value of a capacitance of the electrode;
receiving a communication signal based on the determined operation mode;
generating a first switch control signal and a second switch control signal based on the determined operation mode;
controlling a first switch circuit and a second switch circuit based on the first switch control signal and the second switch control signal;
transmitting the received communication signal to any one of a wireless communication signal processing circuit and an HBC signal processing circuit via the first switch circuit; and
processing the received communication signal;
wherein the determining of the operation mode includes:
measuring the capacitance of the electrode;
comparing the amount of change from the initial value of the measured capacitance with a threshold;
determining the first communication mode as the operation mode, when the amount of change is less than the threshold, and
determining the second communication mode as the operation mode, when the amount of change is greater than or equal to the threshold.

11. The operation method of claim 10, wherein the communication signal uses any one of the air or the human body as a medium.

12. The operation method of claim 10, wherein the first switch circuit includes a first internal switch and a second internal switch, wherein one end of the first internal switch is connected to the antenna and another end of the first internal switch is connected to the wireless communication signal processing circuit,
wherein one end of the second internal switch is connected to the electrode and another end of the second internal switch is connected to the HBC signal processing circuit, and
wherein one end of the second switch circuit is connected to the electrode and another end of the second switch circuit is connected to the antenna.

13. The operation method of claim 10, wherein the receiving of the communication signal includes:
receiving the communication signal via the antenna of the communication device, when the first communication mode is determined as the operation mode of the communication device, and
receiving the communication signal via the electrode of the communication device, when the second communication mode is determined as the operation mode of the communication device.

14. The operation method of claim 10, wherein the controlling of the first switch circuit and the second switch circuit, when the first communication mode is determined as the operation mode of the communication device, includes:
electrically disconnecting an end of the first switch circuit, the end being connected to the electrode, from an end of the first switch circuit, the end being connected to the wireless communication signal processing circuit, based on the first switch control signal;
electrically connecting an end of the first switch circuit, the end being connected to the antenna, with an end of the first switch circuit, the end being connected to the HBC signal processing circuit, based on the first switch control signal; and
electrically disconnecting an end of the second switch circuit, the end being connected to the electrode, from an end of the second switch circuit, the end being connected to the antenna, based on the second switch control signal.

15. The operation method of claim 10, wherein the controlling of the first switch circuit and the second switch circuit, when the second communication mode is determined as the operation mode of the communication device, includes:
electrically connecting an end of the first switch circuit, the end being connected to the electrode, with an end of the first switch circuit, the end being connected to the wireless communication signal processing circuit, based on the first switch control signal;
electrically disconnecting an end of the first switch circuit, the end being connected to the antenna, from an end of the first switch circuit, the end being connected to the HBC signal processing circuit, based on the first switch control signal; and
electrically connecting an end of the second switch circuit, the end being connected to the electrode, with an end of the second switch circuit, the end being connected to the antenna, based on the second switch control signal.

16. A communication system, comprising:
a processor;
a communication device being controlled by the processor, including an electrode, an antenna, an HBC signal processing circuit, and a wireless communication signal processing circuit, and receiving a communication signal via any one of the electrode and the antenna; and
a service module configured to use the communication signal;
wherein the communication device operates in one of a wireless communication mode or an HBC communication mode based on an amount of change from an initial value of a capacitance of the electrode; and
wherein to determine whether to operate in the one of the wireless communication mode or the HBC communication mode, the communication device
measures the capacitance of the electrode,
compares the amount of change from the initial value of the measured capacitance with a threshold,
operates in the wireless communication mode when the amount of change is less than the threshold, and
operates in the HBC communication mode when the amount of change is greater than or equal to the threshold.

17. The communication system of claim 16, wherein the communication device further includes a first switch circuit including a first internal switch and a second internal switch and a second switch circuit,
wherein one end of the first internal switch of the first switch circuit is connected to the electrode and another end of the first internal switch is connected to the HBC signal processing circuit, and
wherein one end of the second internal switch of the first switch circuit is connected to the antenna and another end of the second internal switch is connected to the wireless communication signal processing circuit.

18. The communication system of claim 16, wherein the communication signal is processed by any one of the HBC signal processing circuit and the wireless communication signal processing circuit, and
wherein the processed signal is transmitted to the service module.

* * * * *